(12) United States Patent
Zook et al.

(10) Patent No.: US 9,431,863 B2
(45) Date of Patent: Aug. 30, 2016

(54) INSULATION COMPONENT FOR AN ELECTRIC MACHINE AND METHOD OF ASSEMBLY

(71) Applicant: Remy Technologies LLC, Pendleton, IN (US)

(72) Inventors: Chad Zook, Anderson, IN (US); Kirk Neet, Pendleton, IN (US); Scott Bitzer, Fishers, IN (US)

(73) Assignee: REMY TECHNOLOGIES, LLC, Pendleton, IN (US)

( * ) Notice: Subject to any disclaimer, the term of this patent is extended or adjusted under 35 U.S.C. 154(b) by 453 days.

(21) Appl. No.: 13/953,077

(22) Filed: Jul. 29, 2013

(65) Prior Publication Data

US 2015/0028716 A1    Jan. 29, 2015

(51) Int. Cl.
*H02K 3/34* (2006.01)
*H02K 3/487* (2006.01)

(52) U.S. Cl.
CPC .............. *H02K 3/345* (2013.01); *H02K 3/487* (2013.01); *Y10T 29/49009* (2015.01)

(58) Field of Classification Search
CPC ......... H02K 3/34; H02K 3/345; H02K 3/487
USPC .................................................. 310/214–215
See application file for complete search history.

(56) References Cited

U.S. PATENT DOCUMENTS

| | | | | |
|---|---|---|---|---|
| 5,821,652 A * | 10/1998 | Hyypio | .................. | H02K 11/01 310/196 |
| 5,990,588 A * | 11/1999 | Kliman | .................. | H02K 3/493 310/86 |
| 6,202,285 B1 * | 3/2001 | Bell | ........................ | H02K 15/12 29/596 |
| 2004/0145267 A1 | 7/2004 | Lowry et al. | | |
| 2009/0079292 A1 * | 3/2009 | Horiba | ..................... | H02K 3/34 310/215 |
| 2012/0043110 A1 | 2/2012 | Bradfield | | |
| 2012/0235534 A1 * | 9/2012 | Chamberlin | ........... | H02K 3/345 310/215 |

FOREIGN PATENT DOCUMENTS

| | | |
|---|---|---|
| JP | H06113500 A | 4/1994 |
| JP | 2002044894 A | 2/2002 |
| JP | 2008042959 A | 2/2008 |
| JP | 2009284641 A | 12/2009 |

OTHER PUBLICATIONS

International Search Report and Written Opinion for PCT/US2014/048246, KIPO, Nov. 10, 2014.

* cited by examiner

*Primary Examiner* — Thanh Lam
(74) *Attorney, Agent, or Firm* — Maginot, Moore & Beck LLP (57) ABSTRACT

An electric machine includes a core with a plurality of teeth that extends between end faces of the core. Slots are defined in the core between adjacent teeth of the plurality of teeth. The slots each have a radial opening formed between end portions of the adjacent teeth. An insulation sheet is positioned on the core to obstruct the radial openings to the slots. The insulation has at least two spaced circumferential members that respectively overlap the end faces of the core. The insulation sheet also has a plurality of spaced axial members connected to the circumferential members. The axial members are positioned within the slots to obstruct the radial openings to the slots.

18 Claims, 7 Drawing Sheets

INSULATION COMPONENT FOR AN ELECTRIC MACHINE AND METHOD OF ASSEMBLY

FIELD

This application relates to the field of electric machines, and particularly to electrical insulation of electric machines.

BACKGROUND

Windings used in modern electrical machine applications are commonly configured in any of various forms including, for example, standard-wind configurations, S-wind configurations or segmented conductor configurations. S-wind configurations typically include a continuous length of wire that is wound in an out of various slots in the core portion of the electric machine to form a complete winding. The wire includes relatively straight lengths that are positioned within the slots of the core portion and curved lengths that extend between in-slot portions at the ends of the core portion. Similarly, in a segmented winding configuration, the windings typically comprise a plurality of segmented conductors which include in-slot portions and ends that are connected together. The in-slot portions of the conductors are positioned in the slots of a laminated core portion of the electric machine (e.g. stator slots), and the ends of the conductors are connected to form windings for the electric machine.

Segmented conductors for electric machines are often provided in the form of U-shaped conductors which include two legs and a central U-turn or bend portion extending between the legs. Such segmented conductors are typically created by bending and twisting wire bars into U-shaped conductors with two legs and a U-turn between the legs. The two legs are separated by a given span which allows the conductor to extend across a number of stator slots by virtue of the U-turn alone. The legs of the conductors are then inserted into the slots of the core from an insertion end of the core. After insertion of the conductors into the slots of the core, the bend portions are positioned on one side of the core and the leg ends extend from the other side of the core. The legs ends may then be bent to appropriate positions, often with a first leg typically bent in one direction and another leg bent in the opposite direction such that the entire segmented extends a given slot span (e.g., 12 slots). Finally, the tips of the leg ends are connected together at the connection side of the stator to complete the windings. These connections include adjacent leg ends that are aligned directly and welded together, non-adjacent leg ends that are connected through jumper wires, and terminal connections. Together, the connected conductors form the complete winding arrangement.

Although the conductors are connected together at their ends, care must be taken to ensure that adjacent conductors do not touch each other and short-circuit the designed winding arrangement. Accordingly, electrical insulation is typically provided on the conductors to electrically insulate the conductors from one another. Segmented conductor insulation systems typically include an enamel coating that is applied and bonded directly on the bare copper wire by the wire manufacturer. Different grades of materials and temperature classes may be used for this initial layer of insulation. The electric machine manufacturer also typically includes a slot liner or insulation sleeve positioned along the walls of the slots in the lamination stack. The insulation sleeve prevents the conductors from short-circuiting against the core.

In addition to an enamel coating on the conductors and insulation sleeves in the core slots, some winding arrangements also include insulation wedges. The insulation wedges are positioned across the radial openings to the core slots to further insulate the conductors from short-circuiting against the core and to maintain the position of the conductors in the slots during assembly of the electric machine. Insulation wedges may be utilized with different winding configurations, including standard wind configurations, S-wind configurations, and segmented conductor configurations. However, the application of such insulation wedges in electric machines can be problematic due to the design of the core, the conductors, or the windings in some of these machines. In some instances, for example, the size or geometry of the core, the conductors, or both makes installation and alignment of the insulation wedges in the core slots difficult.

Accordingly, it would be advantageous to provide an insulation component for electric machines which provides high integrity insulation and facilitates assembly while also avoiding the wedge paper installation problem that results from some core designs. It would be advantageous if such insulation component could be provided easily and at relatively low cost to the manufacturer. It would also be advantageous if such insulation component could be used in association with different winding configurations.

SUMMARY

In accordance with one embodiment of the disclosure, there is provided an electric machine including a core with a plurality of teeth. The plurality of teeth extends between end faces of the core and defines slots in the core between adjacent teeth of the plurality of teeth. The slots each have a radial opening formed between end portions of the adjacent teeth. An insulation sheet is positioned on the core to obstruct the radial openings to the slots. The insulation sheet has at least two spaced circumferential members that overlap the respective end faces of the core. The insulation sheet also has a plurality of spaced axial members connected to the circumferential members. The axial members are positioned within the slots to obstruct the radial openings to the slots.

A method is provided for electrically insulating a core of an electrical machine. The method includes positioning an insulation sheet proximate to the core. The core has a plurality of teeth with adjacent teeth of the plurality of teeth forming slots in the core. The slots extend axially between end faces of the core. The method further includes inserting the insulation sheet into the slots to obstruct radial openings to the slots formed between end portions of the adjacent teeth. At least two spaced circumferential members of the insulation sheet overlap a portion of the core. A plurality of spaced axial members connected to the circumferential members obstructs the radial openings to the slots in the core.

The above described features and advantages, as well as others, will become more readily apparent to those of ordinary skill in the art by reference to the following detailed description and accompanying drawings. While it would be desirable to provide an insulation sheet for an electric machine that provides one or more of these or other advantageous features, the teachings disclosed herein extend to those embodiments which fall within the scope of the appended claims, regardless of whether they accomplish one or more of the above-mentioned advantages.

DESCRIPTION

Figure 1:
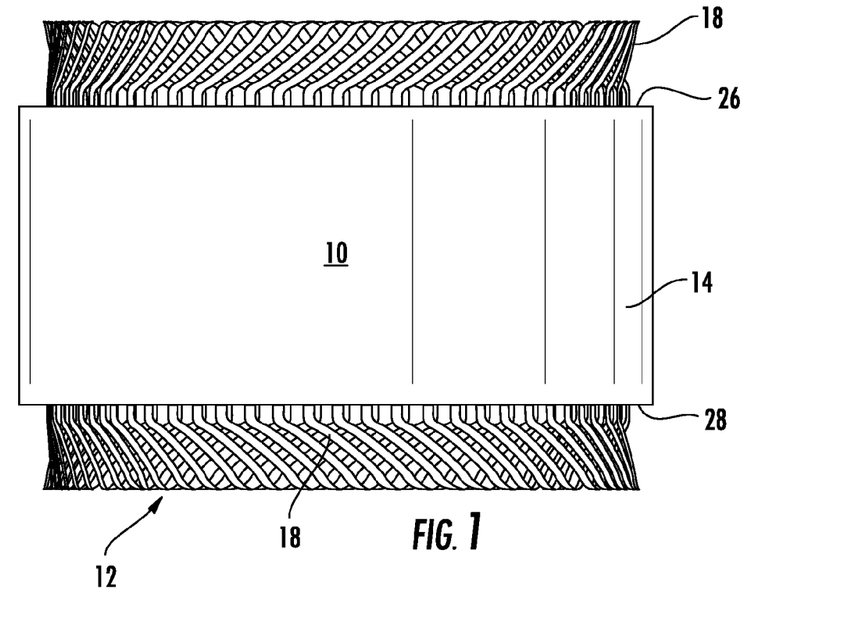
FIG. 1 shows a side view of an embodiment of a core of an electric machine with a winding positioned in the core.

With reference to FIG. 1, an exemplary electric machine core 10 is shown with a winding arrangement 12 positioned on the core. The core 10 in the embodiment of FIG. 1 is a stator that is magnetically coupled to a rotor (not shown) through the winding arrangement 12. Although the core 10 is represented as a stator in the embodiment of FIG. 1, it will be recognized that in other embodiments, the winding arrangement 12 may be provided on the rotor. The stator 10 includes a main body portion 14 with a plurality of slots 16 (see FIG. 2) formed therein. A plurality of conductors, such as segmented conductors 18, is placed in slots of the stator 10 to form the winding arrangement 12. Insulators shield the conductors from electrical contact with the core. As explained in further detail below, these insulators include an insulation member provided in the slots, such as insulation sheet 40 described below in association with FIGS. 4-9.

Figure 2:
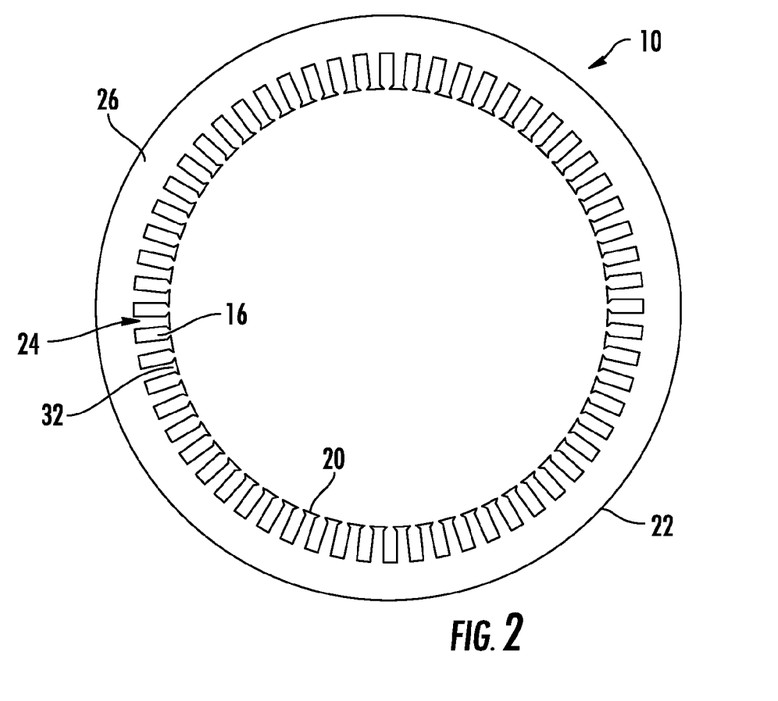
FIG. 2 shows a diagrammatic top view of the core of FIG. 1.

FIG. 2 shows a top view of the exemplary electric machine core 10 of FIG. 1 without the windings 18 placed in the stator slots 16. As shown in FIG. 2, the stator is generally cylinder shaped with an inner circumferential perimeter 20 and an outer circumferential perimeter 22. The stator 10 has a plurality of teeth 24 that extend axially between end faces 26, 28 (see FIG. 1) of the stator 10 with adjacent teeth of the plurality of teeth 10 defining each of the slots 16. The exemplary stator 10 of FIG. 2 has sixty slots 16. In other embodiments, the stator 10 may include more slots or fewer slots. Radial openings 30 to the slots 16 are provided through the inner perimeter 20 between end portions 32 of the adjacent teeth, and axial openings to the slots 16 are provided through the end faces 26, 28 of the stator 10.

Figure 3:
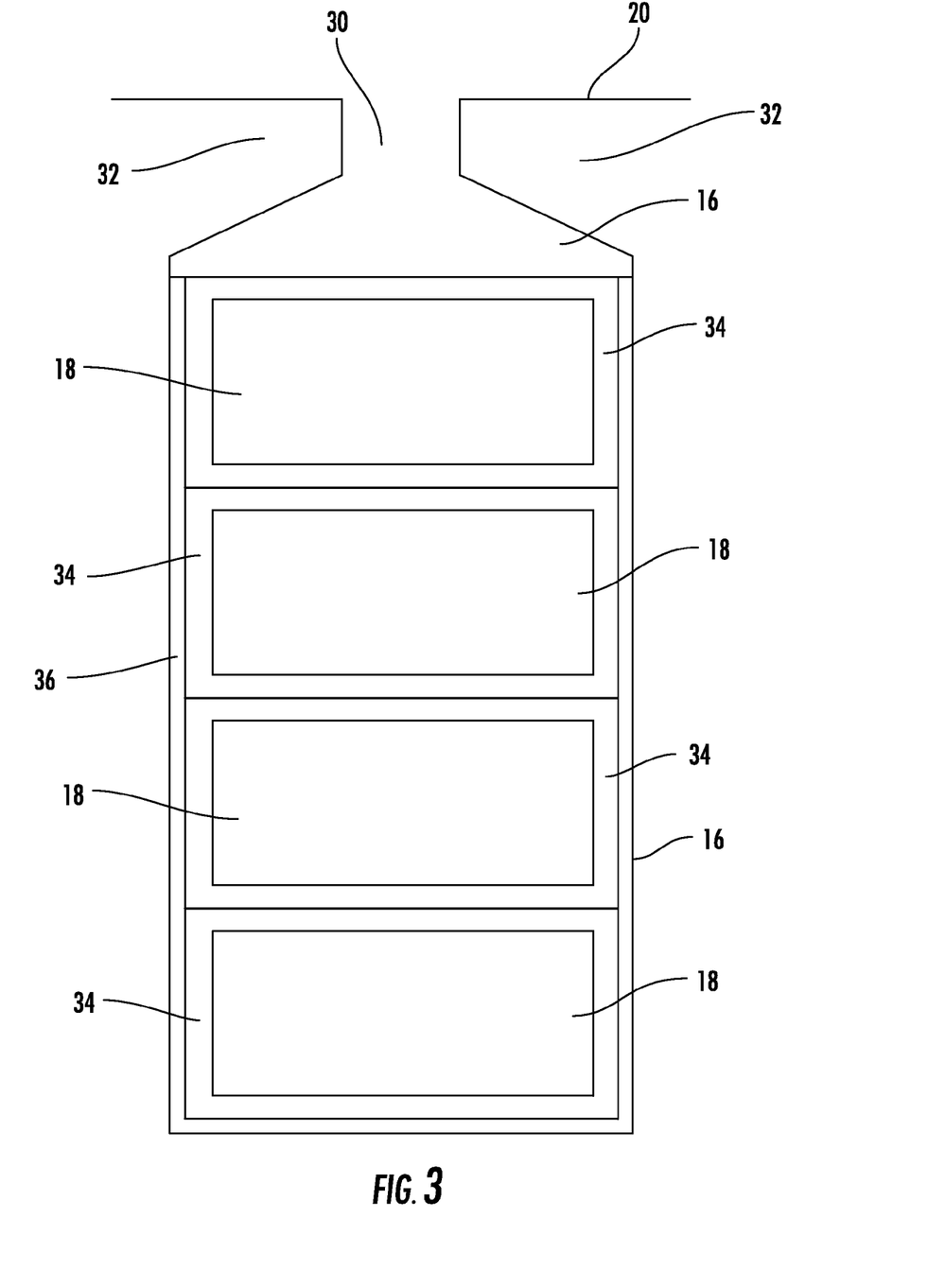
FIG. 3 shows a diagrammatic cross-sectional view of a slot in the core of FIG. 1.

FIG. 3 shows an enlarged cross-sectional view of one of the slots 16 of the stator 10 with the segmented conductors 18 placed in the stator. In the exemplary embodiment of FIG. 3, the segmented conductors 18 have a rectangular cross-section and four conductors 18 are placed in each slot 16. In other embodiments, the conductors 18 may have a different shape and more or less conductors may be placed in each slot 16. Moreover, although the conductors 18 are shown and described in the exemplary embodiment shown herein as being segmented conductors, it will be appreciated by those of ordinary skill in the art that the conductors may be part of different winding configurations, such as standard or S-wind configurations. In the segmented conductor arrangement described herein, each conductor 18 is separated from neighboring conductors in the slot 16 by at least one insulation layer 34 and, in some embodiments, is separated from the stator 10 by an insulation sleeve 36 positioned adjacent to surfaces of the slot 16. As shown in FIG. 3, the insulation sleeve 36 is positioned to substantially surround the conductors 18 in each of the slots 16.

Figure 4:
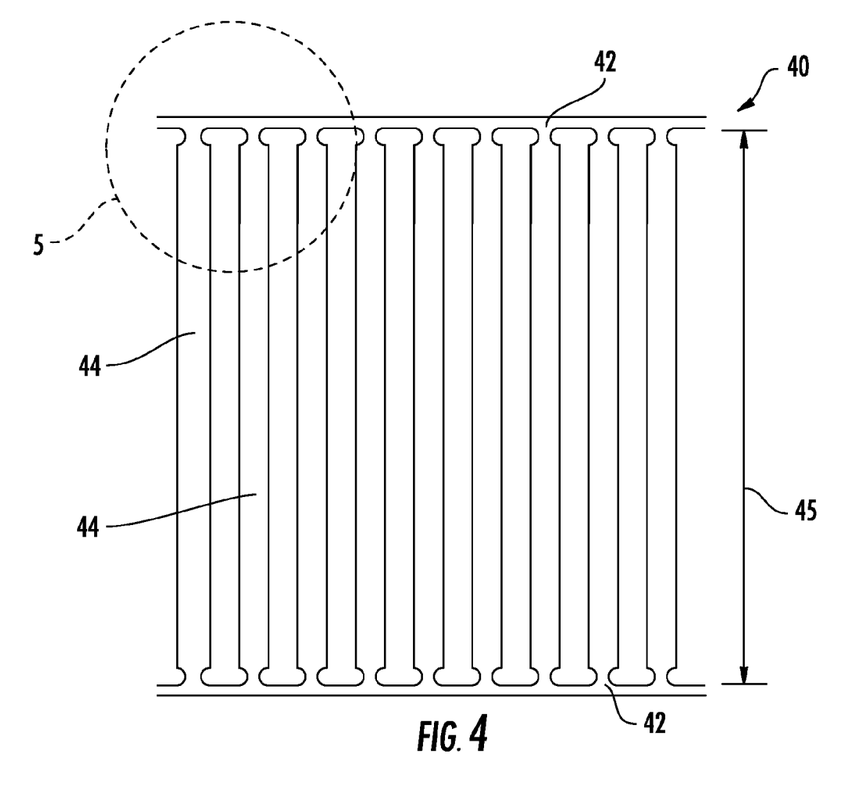
FIG. 4 shows a side view of an insulation sheet for electrically insulating the winding from the core of FIG. 1.

FIG. 4 shows a side view of an exemplary insulation sheet 40 for insulating and maintaining the positions of the conductors 18 of the stator of FIG. 1. The exemplary insulation sheet 40 of FIG. 4 includes two spaced circumferential members 42 and a plurality of spaced axial members 44 connected to the circumferential members 42. In other embodiments, the insulation sheet 40 may include greater or fewer spaced circumferential members 42. As discussed in more detail below, the axial members 44 of the insulation sheet 40 are configured to obstruct the radial openings 30 to the slots 16 of the stator 10 when the insulation sheet 40 is positioned on the stator.

Figure 5:
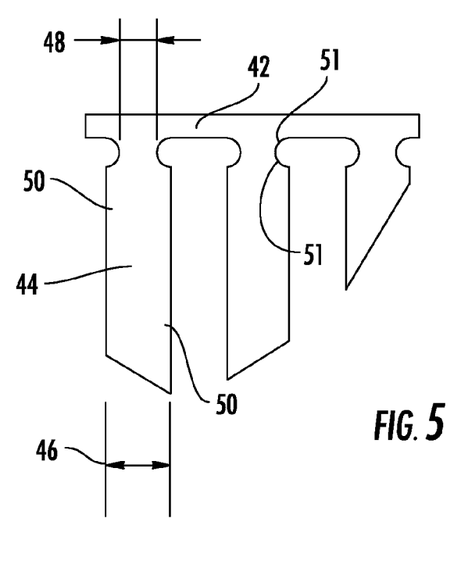
FIG. 5 shows an enlargement of a portion of the side view of FIG. 4.

FIG. 5 shows an enlarged portion of the side view of FIG. 4 to illustrate features of the insulation sheet 40. As shown in FIG. 5, the axial members 44 each have a first circumferential width 46 that is substantially uniform along their lengths 45 (see FIG. 4) between the circumferential members 42. The length 45 of the axial members 44 between the connections of their respective ends to the circumferential members 42 is greater than the slot axial length of the stator slots 16 to insulate the conductors 18 from the stator 10. In at least one embodiment, the insulation sheet 40 includes an equal number of axial members 44 as there are slots 16 in the stator 10.

At the connection of the axial members 44 to the circumferential members 42, the axial members 44 each have a second circumferential width 48 that is smaller than the first circumferential width 46. The different widths 46, 48 of the axial members 44 near the connection of the axial members 44 to the circumferential members 42 facilitate movement of each axial member 44, or portions thereof, relative to the other portions of the axial member and/or the circumferential members 42. The movement of the axial members 44 may include bending or rotating of the entire axial member 44 or of one or more axial edge portions 50 of the axial member about an axis of the axial member 44. In the exemplary embodiment of FIG. 5, the insulation sheet 40 has a ratio of the first circumferential width 46 to the second circumferential width 48 of approximately 1.53 to 1. The ratio of these widths 46, 48 in other embodiments may be less than or greater than 1.53 to 1.

As shown in the exemplary embodiment of FIG. 5, the insulation sheet 40 has smooth, arcuate transitions 51 from the circumferential members 42 to the axial members 44 and from the second circumferential width 48 to the first circumferential width 46 to reduce material stress when the axial members 44 bend or rotate. The transitions 51 in the embodiment of FIG. 5 have a radius of 0.4 millimeters. In other embodiments, the radius of the transitions 51 may be less than or greater than 0.4 millimeters. In yet further embodiments, one or more slits may be provided near the connection of the axial members 44 to the circumferential members 42 in addition to or in place of the arcuate transitions 51 to reduce material stress when the axial members 44 bend or rotate.

Figure 6:
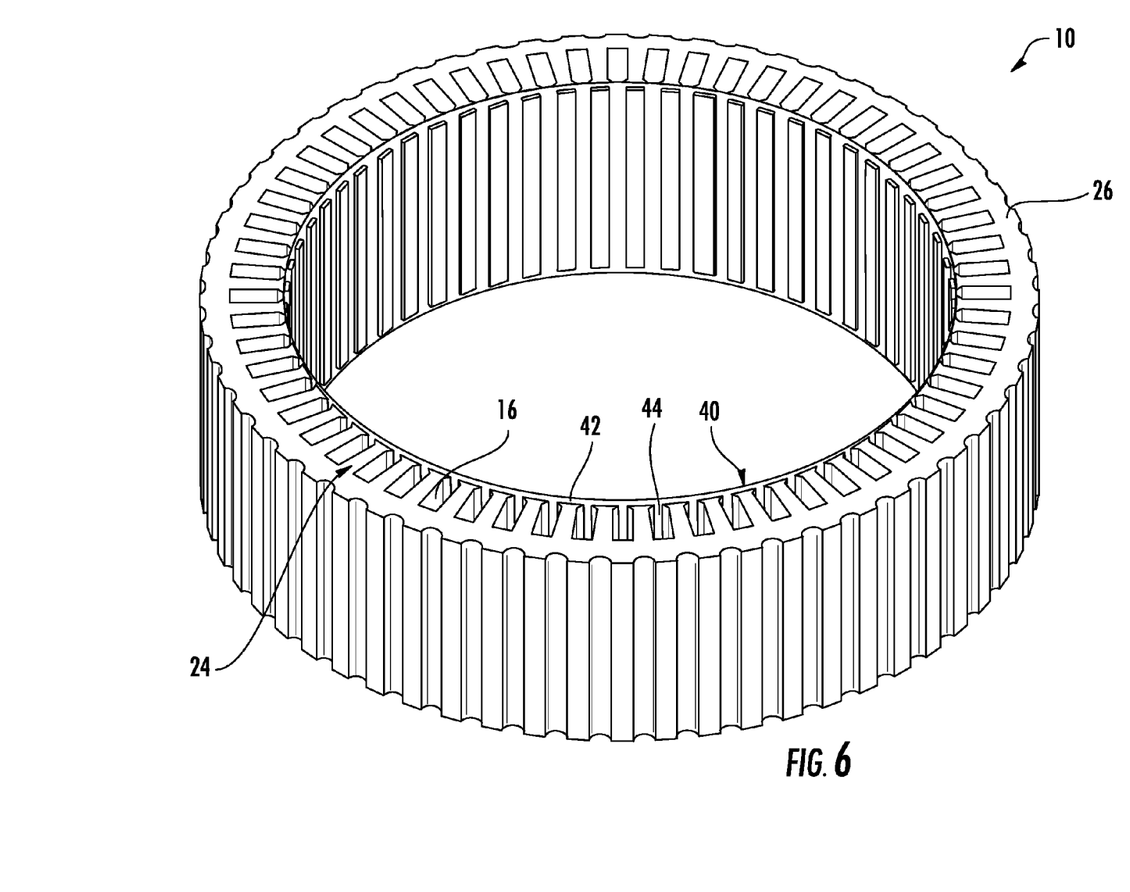
FIG. 6 shows a perspective view of the insulation sheet of FIG. 4 positioned on the core of FIG. 1.
Figure 7:
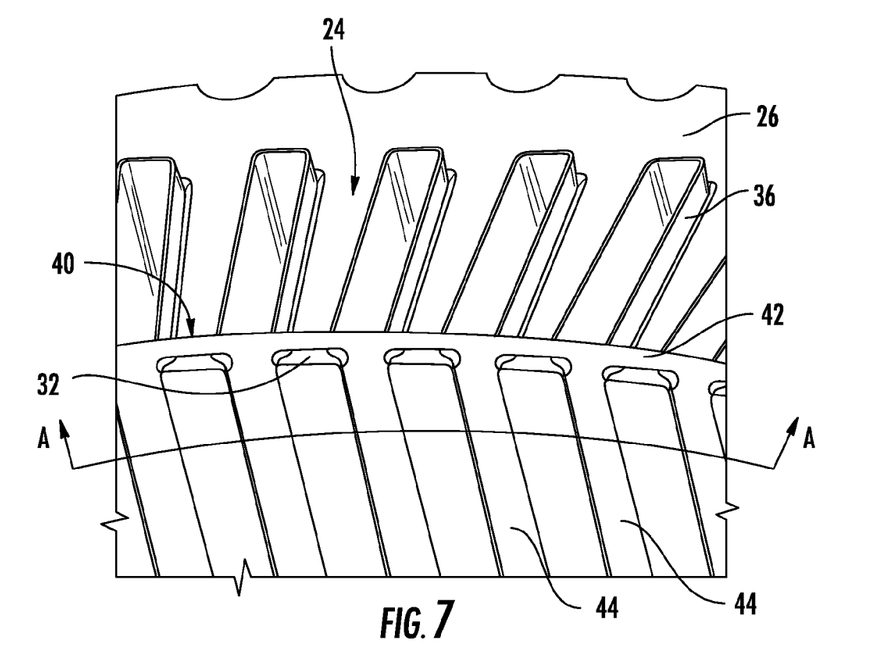
FIG. 7 shows an enlargement of a portion of the perspective view of the insulation sheet and the core of FIG. 6.

FIG. 6 and FIG. 7 show perspective views of the stator 10 of FIG. 2 with the exemplary insulation sheet 40 of FIG. 5 positioned on the stator. As best shown in FIG. 7, which shows an enlarged view of a portion of the stator 10 of FIG. 6 with the insulation sleeves 36 positioned in the slots 16, the spaced circumferential members 42 of the insulation sheet 40 are positioned axially beyond the end faces 26, 28 of the stator 10 and overlap a portion of the teeth 24 near the end portions 32 of the teeth 24. The positioning of the circumferential members 42 axially beyond the end faces 26, 28 enables the axial members 44 of the insulation sheet 40 to be inserted into the slots 16 of the stator 10 from a position radially inward of the inner perimeter 20 (see FIG. 2) to a position radially outward of the inner perimeter 20.

In the exemplary embodiment of FIG. 6, the circumferential members 42 of the insulation sheet 40 extend substantially around the end faces 26, 28 of the stator 10 and one of the axial members 44 is positioned in each of the slots 16. In other embodiments, the circumferential members 42 may extend around only a portion of the end faces 26, 28. In some embodiments in which the insulation sheet 40 extends around only a portion of the end faces 26, 28, one or more additional insulation sheets (not shown) may be positioned on the stator 10 in combination with the insulation sheet 40. The insulation sheet 40 and the one or more additional insulation sheets may extend around a portion of the end faces 26, 28 or may extend substantially around the end faces. For example, in a ninety-six-slot stator, four different insulation sheets with twenty-four axial members each may be used to fill the slots with axial members.

Figure 8:
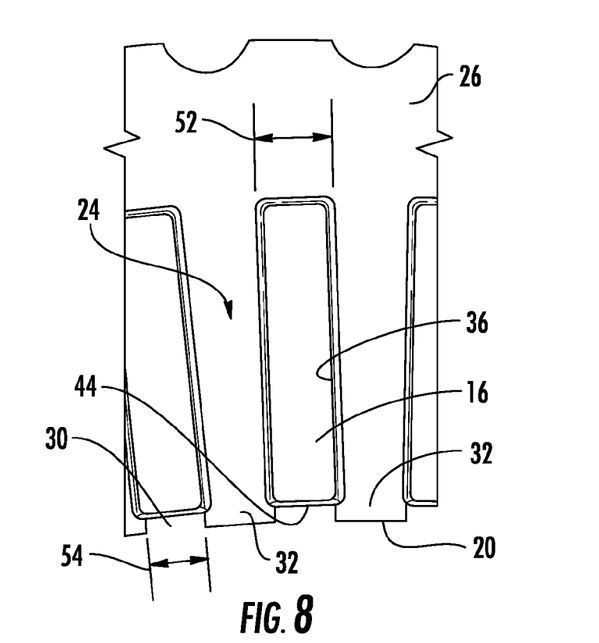
FIG. 8 shows a radial section view through the insulation sheet and the core of FIG. 7 along line A-A.

FIG. 8 shows a radial section view through the portion of the stator 10 of FIG. 7 along line A-A to illustrate the placement of the axial members 44 within the slots 16 when the insulation sheet 40 is positioned on the stator. The slots 16 have a generally constant slot width 52 across the portions of the slot 16 into which the conductors 18 are inserted in the stator 10. The radial openings 30 to the slots 16 have an opening width 54 between the end portions 32 of the teeth 24. In the exemplary embodiments shown in the figures, the opening width 54 is smaller than both the slot width 52 and the first circumferential width 46 of the axial members 44. The smaller size of the opening width 54 with respect to the first circumferential width 46 enables the end portions 32 of the teeth 24 to retain the axial members 44 within the slot 16 after the insulation sheet 40 is positioned on the stator 10. In the exemplary embodiment of FIG. 8, the first circumferential width 46 of the axial members 44 is shown smaller than the slot width 52 of the slots. In other embodiments, the first circumferential width 46 can be equal to or greater than the slot width 52 of the slots 16. In embodiments in which the first circumferential width 46 is greater than the slot width 52, the axial member 44 can bend or rotate to fit within the slot 16.

With reference to FIG. 7 and FIG. 8, the circumferential members 42 of the insulation sheet 40 are shown offset from the inner perimeter 20 of the stator 10 such that the circumferential members 42 overlap a portion of the teeth 24 near the end portions 32 of the teeth 24. The amount of overlap of the circumferential members 42 with the teeth 24 of the stator 10 substantially determines the position of the axial members 44 within the slot 16. With particular reference to FIG. 8, the circumferential members 42 overlap the end portions 32 of the teeth 24 such that the axial members 44 are positioned approximately midway between the transition of slot width 52 to the opening width 54 and the inner perimeter 20. In other embodiments, the circumferential members 42 can overlap more or less of the end portions 32 of the teeth 24 such that axial members 42 are positioned further from or closer to, respectively, the inner perimeter 20. As best shown in FIG. 8, the axial members 44 are positioned radially inward from the insulation sleeves 36 regardless of the amount of overlap of the circumferential members 42 with the end portions 32 of the teeth 24.

The exemplary insulation sheet 40 of FIGS. 4-8 is formed from DuPont Nomex® Paper Type 410 and has a thickness of approximately 0.127 millimeters. In other embodiments, the insulation sheet 40 may be formed from other materials that have the same or a different thickness. Such alternative materials may include other flame-resistant aramids that offer comparable inherent dielectric strength, mechanical toughness, flexibility, and resilience.

Figure 9:
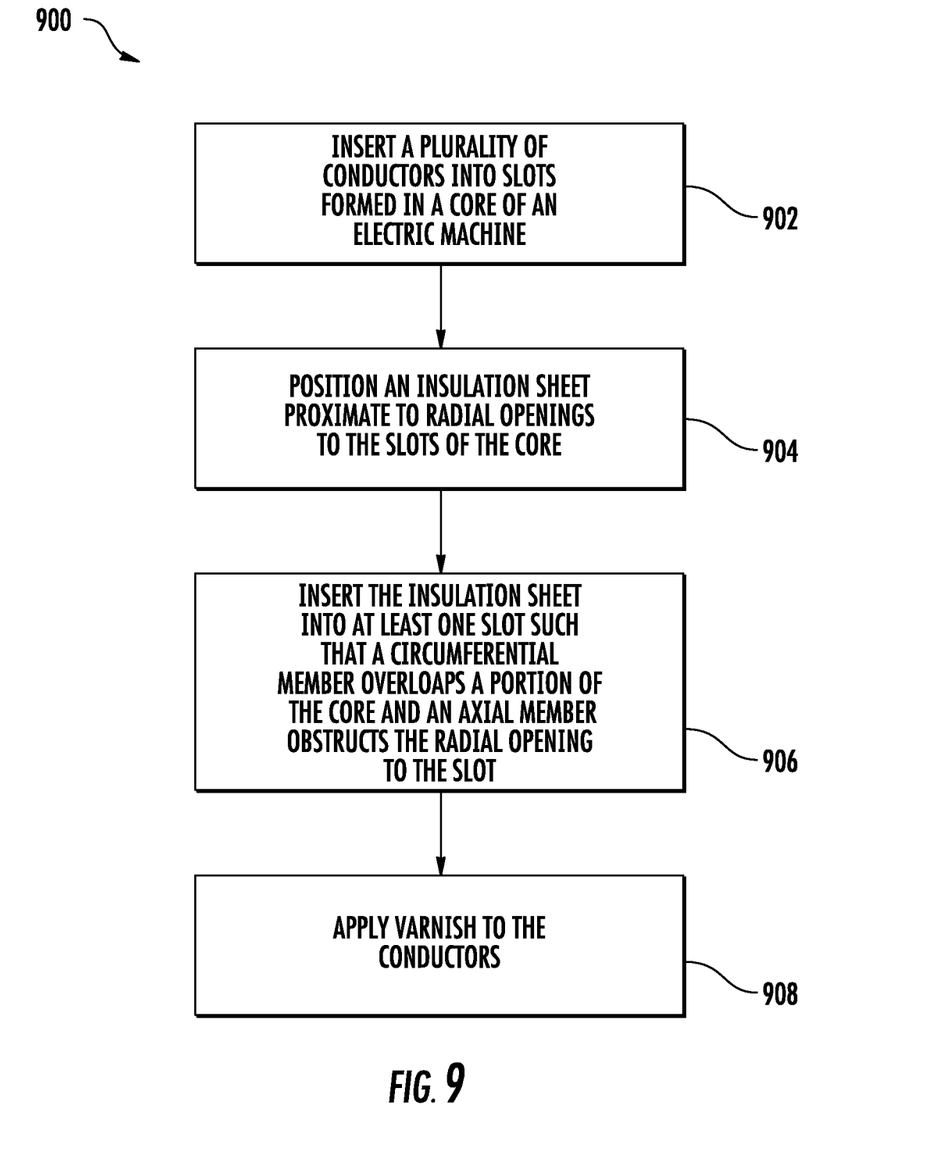
FIG. 9 shows a flow diagram of a method for electrically insulating a core of an electric machine.

A flow diagram of a method 900 for electrically insulating a core 10 of an electric machine is shown in FIG. 9. In the discussion below, a reference to the method performing a function or action refers to one or more of a human operator and associated manufacturing equipment performing the function or action. The method begins by inserting a plurality of conductors 18 in slots 16 formed in the core 10 to form a winding arrangement (block 902). The slots 16 are defined by adjacent teeth of a plurality of teeth 24 positioned about the core 10. The slots 16 extend axially between end faces 26, 28 of the core 10 and have radial openings 30 formed between end portions 32 of the adjacent teeth through an inner perimeter 20 of the core 10.

Once the conductors 18 are placed in the slots 16 (block 902), an insulation sheet 40 (FIGS. 4-8) is positioned proximate to the radial openings 30 to the slots 16 of the core 10 (block 904). The insulation sheet 40 is then positioned onto the core 10 such that at least two spaced circumferential members 42 of the insulation sheet 40 overlap the respective end faces 26, 28 of the core 10 and a plurality of axial members 44 each connected to the circumferential members 42 is positioned in the slots 16 (block 906).

The positioning of the axial members 44 in the slots 16 includes translating the axial members 44 in a generally radial direction from a first position radially inward of the inner perimeter 20 of the core 10 to a second position radially outward of the inner perimeter 20 and within slots 16. The radial openings 30 have an opening width 54 that is smaller than a first circumferential width 46 of the axial members 44. During the positioning of the axial members 44 from the first position to the second position (block 906), portions of the axial members 44 or the entire axial members 44 bend or rotate to pass through the smaller-sized radial openings 30. Once the insulation sheet 40 is positioned onto the core (block 906), an insulating material, such a varnish, is applied to the conductors 18 within the slots 16 to protect the conductors 18 from their operating environment and to further insulate the conductors 18 from the core 10 and from one another (block 908).

Figure 10:
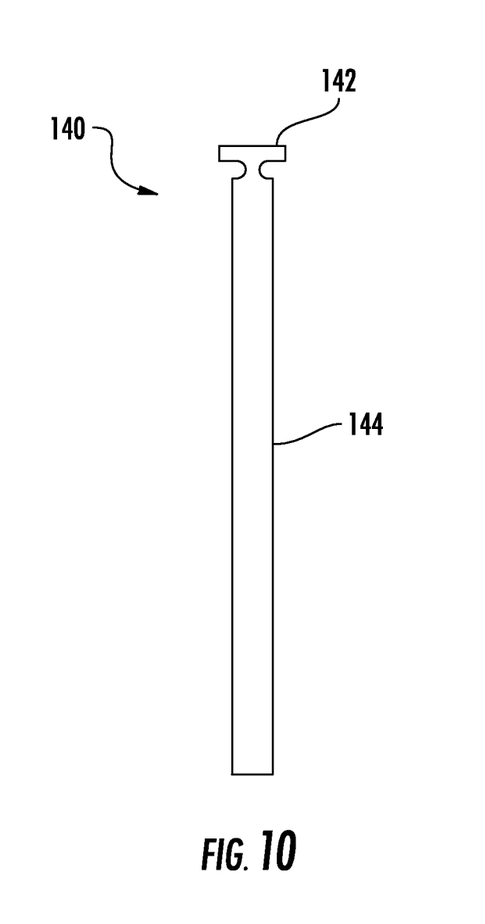
FIG. 10 and FIG. 11 show side views of alternative embodiments of the insulation sheet of FIG. 4.
Figure 11:
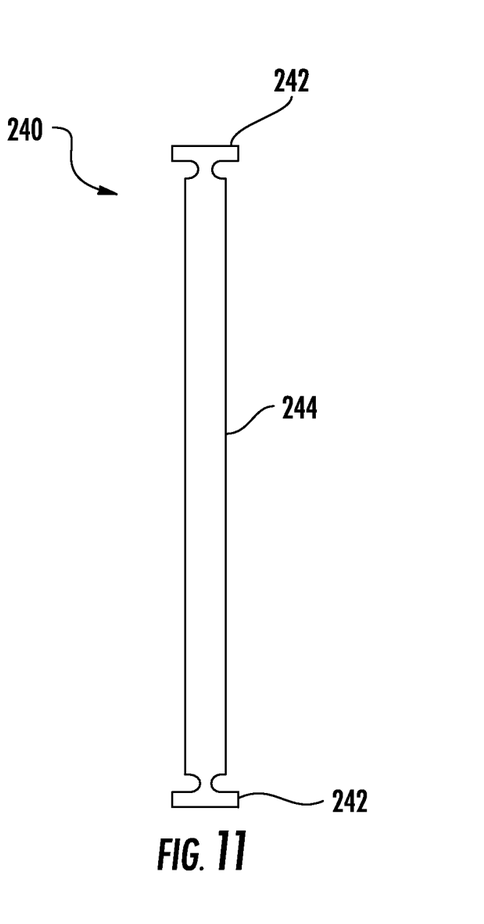

The foregoing detailed description of one or more embodiments of the insulation sheet has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed embodiments and other features and functions, or alternatives thereof, may be desirably combined into many other different embodiments, systems or applications. For instance, in one alternative embodiment, the insulation sheet 140 (see FIG. 10) includes one circumferential member 142 and one axial member 144 connected to the circumferential member 142 to produce a single insulation sheet with a T-shaped geometry. In this embodiment, one or more T-shaped insulation sheets may be positioned on the core to obstruct the radial openings to the slots in the core. In another alternative embodiment, the insulation sheet 240 (see FIG. 11) includes two spaced circumferential members 242 and one axial member 244 connected to the circumferential members 242 to produce a single insulation sheet with an I-shaped geometry. Similar to the T-shaped insulation sheet 140, one or more I-shaped insulation sheets may be positioned on the core to obstruct the radial openings to the slots. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the embodiments contained herein.

What is claimed is:

1. An electric machine comprising:
a core having a plurality of teeth that extend axially between end faces of the core, adjacent teeth of the plurality of teeth defining a slot with a radial opening formed between end portions of the adjacent teeth; and
an insulation sheet including at least two spaced side portions and a connecting portion connected to the side portions, the side portions overlapping a portion of the core to position the connecting portion in the slot to obstruct the radial opening.

2. The electric machine of claim 1 wherein the insulation sheet includes a plurality of spaced connecting portions connected to the side portions, each of the connecting portions positioned to obstruct respective radial openings formed between end portions of adjacent teeth.

3. The electric machine of claim 1 wherein each of the adjacent teeth has a radial face extending axially along a portion of the end portions of the adjacent teeth, the connection portion of the insulation sheet being offset from the radial faces of the adjacent teeth when the connecting portion is positioned to obstruct the radial opening.

4. The electric machine of claim 1 wherein:
the radial opening has a first width measured in a circumferential direction between the end portions of the adjacent teeth,
the slot at a position offset from the end portions has a second width measured in the circumferential direction between the adjacent teeth, and
the connecting portion of the insulation sheet has a third width measured in the circumferential direction, the first width being less than the second width and the third width being greater than the first width and one of greater than, less than, or equal to the second width.

5. The electric machine of claim 4 wherein the connecting portion of the insulation sheet at the connection of the connecting portion and at least one of the side portions has a fourth width measured in the circumferential direction, the fourth width being less than the third width to enable a portion of the connecting portion to bend or rotate.

6. The electric machine of claim 1 further comprising an insulation sleeve positioned in the slot to cover surfaces of the adjacent teeth that define the slot.

7. The electric machine of claim 6 wherein the insulation sleeve extends past at least one of the end faces of the core, at least one of the side portions of the insulation sheet being positioned to overlap a portion of the insulation sleeve that extends past the at least one end face.

8. The electric machine of claim 6 further comprising at least one electric conductor positioned in the slot, the insulation sleeve electrically insulating the at least one electric conductor from the surfaces of the adjacent teeth that define the slot.

9. The electric machine of claim 1 wherein the insulation sheet has a thickness of approximately 0.127 millimeters.

10. The electric machine of claim 1 wherein the insulation sheet is formed from flame-resistant aramid material.

11. The electric machine of claim 1 wherein the side portions and the connecting portion integrally form the insulation sheet.

12. An electric machine comprising:
a core having a plurality of teeth, adjacent teeth of the plurality of teeth defining a slot that extends axially between end faces of the core; and
an insulation sheet including a first circumferential member and an axial member connected to the first circumferential member, the first circumferential member overlapping a first portion of the core and the axial member positioned in the slot.

13. The electric machine of claim 12 wherein the insulation sheet includes a plurality of spaced axial members connected to the first circumferential member, each of the axial members positioned to radially obstruct respective slots defined by adjacent teeth of the plurality of teeth.

14. The electric machine of claim 12 wherein the insulation sheet further includes a second circumferential member spaced from the first circumferential member, the second circumferential member being connected to the axial member and overlapping a second portion of the core.

15. The electric machine of claim 14 wherein the first and second circumferential members extend substantially around the end faces and one of the plurality of axial members is positioned in each of the slots.

16. The electric machine of claim 12 wherein:
the adjacent teeth each have end portions that reduce a width of the slot at the end portions in a circumferential direction, and
the axial member has a first width in the circumferential direction that is greater than the width of the slot at the end portions such that the end portions of the adjacent teeth facilitate radial retention of the axial member within the slot.

17. The electric machine of claim 16 wherein the axial member of the insulation sheet at the connection of the axial member and the first circumferential member has a second width measured in the circumferential direction, the second width being less than the first width to enable a portion of the axial member to bend or rotate.

18. The electric machine of claim 12 wherein the core of the electric machine is a stator core.

* * * * *